(12) United States Patent
Gangstoe et al.

(10) Patent No.: US 7,863,858 B2
(45) Date of Patent: Jan. 4, 2011

(54) AUTHENTICATING A DEVICE AT A BATTERY PACK USING A RANDOM NUMBER GENERATOR

(75) Inventors: Gunnar Gangstoe, Trondheim (NO); Hideyuki Sato, Chiba (JP); Arne Aas, Trondheim (NO)

(73) Assignees: ATMEL Corporation, San Jose, CA (US); SONY Corporation (JP)

( * ) Notice: Subject to any disclaimer, the term of this patent is extended or adjusted under 35 U.S.C. 154(b) by 0 days.

(21) Appl. No.: 12/482,375

(22) Filed: Jun. 10, 2009

(65) Prior Publication Data

US 2009/0243539 A1 Oct. 1, 2009

Related U.S. Application Data

(63) Continuation of application No. 11/373,859, filed on Mar. 10, 2006, now Pat. No. 7,554,288.

(51) Int. Cl.
*H01M 10/46* (2006.01)
(52) U.S. Cl. ..................................... 320/106
(58) Field of Classification Search .................. 320/106, 320/107, 110, 112; 710/52; 713/161, 184; 380/44
See application file for complete search history.

(56) References Cited

U.S. PATENT DOCUMENTS

| | | | |
|---|---|---|---|
| 5,608,306 A | 3/1997 | Rydbeck | |
| 6,175,211 B1 * | 1/2001 | Brotto | 320/106 |
| 6,211,644 B1 * | 4/2001 | Wendelrup et al. | 320/106 |
| 6,439,622 B1 | 8/2002 | Iwatsuki | |
| 6,504,341 B2 * | 1/2003 | Brotto | 320/106 |
| 6,605,922 B2 | 8/2003 | Tamai | |
| 6,975,092 B2 | 12/2005 | Edington | |
| 2005/0001589 A1 | 1/2005 | Edington et al. | |
| 2005/0057216 A1 | 3/2005 | Yamaguchi et al. | |
| 2005/0108309 A1 | 5/2005 | Tsuboka | |
| 2005/0188206 A1 * | 8/2005 | Kwok | 713/176 |

OTHER PUBLICATIONS

"FlexiHash™ for Battery Authentication", Intersil ISL6296 Data Sheet, Jan. 17, 2007.
PCT International Search Report in corresponding PCT app #PCT/US2007/063622 dated Feb. 6, 2008, 2 pages.
Qian, "Battery Authentication Improves Battery Security", Oct. 24, 2005.

* cited by examiner

*Primary Examiner*—Edward Tso
(74) *Attorney, Agent, or Firm*—Fish & Richardson P.C.

(57) ABSTRACT

Apparatus, method and computer program product are provided for battery management. In one implementation, a method of communication provided. The method includes enabling determining when a battery pack is coupled to a device, the battery pack including a battery management system. The method also includes generating a random number at the battery management system, the battery management system including battery monitoring circuitry, a processor, memory and a random number generator. The method includes using the random number to provide authentication and if authentication succeeds, enabling communication between the battery pack and the device.

11 Claims, 5 Drawing Sheets

AUTHENTICATING A DEVICE AT A BATTERY PACK USING A RANDOM NUMBER GENERATOR

CROSS-REFERENCE TO RELATED APPLICATIONS

This application is a continuation application of U.S. patent application Ser. No. 11/373,859, filed on Mar. 10, 2006. The entire disclosure of U.S. patent application Ser. No. 11/373,859 is incorporated herein by reference.

TECHNICAL FIELD

This application is generally related to electrical devices.

BACKGROUND

Many modern portable devices (e.g., laptop computers, mobile phones, digital cameras, video cameras, media players, personal digital assistants ("PDAs"), game console, etc.) include battery packs. One particular type of conventional battery pack includes one or more battery cells coupled to one or more Integrated Circuit ("IC") chips. The chips typically include a controller (e.g., a microcontroller) and circuitry and provide, among other things, battery cell management and protection.

Some conventional battery packs include a Lithium ion ("Li-ion") battery cell, which is essentially a volatile chemical reaction packaged inside a cylinder. Potential energy is stored in each cell, and if the battery cell is exposed to conditions outside of its specification the cell can overheat, catch fire or explode. Conventional battery packs configured with these volatile cells typically include fail-safe circuitry for detecting unsafe conditions (e.g., charge or discharge overcurrents, short circuits, etc.), and for taking corrective action to prevent damage to the battery cell and/or device, and to protect the end user.

Some conventional battery packs can communicate with a connected device. For example, the battery pack can communicate battery charge (or capacity) level data to the device or charger. The device/charger can use the received battery charge information, for example, to present a display of battery level to a user of the device/charger. Some conventional devices/chargers are designed for particular battery pack types (e.g., battery packs from a particular manufacturer). The devices/chargers can be designed for the particular battery pack type, for example, to enhance security of the device, to ensure proper communication between the battery pack and the device/charger (e.g., correct charge level information), as well as proper operation of the device/charger (e.g., proper regulation of the power provided to the device).

SUMMARY

In one implementation, an apparatus, method and computer program product are provided for battery management. In general, in one aspect, a method of communication provided. The method includes enabling determining when a battery pack is coupled to a device, the battery pack including a battery management system. The method also includes generating a random number at the battery management system, the battery management system including battery monitoring circuitry, a processor, memory and a random number generator. The method includes using the random number to provide authentication and if authentication succeeds, enabling communication between the battery pack and the device.

Implementations of the method can include one or more of the following features. The authentication can further include determining whether the device is an authorized device. The authentication can further include performing one or more steps required to allow the device to determine whether the battery pack is authorized for use with the device. The authentication can further include encrypting the random number using a first encryption key and transmitting the encrypted random number to the device. The authentication can further include receiving an encrypted random number from the device and decrypting the received encrypted random number using a second encryption key. The authentication can further include comparing the generated random number with the random number decrypted using the second encryption key.

The method can further include limiting communication between the battery pack and the device if authentication fails. Limiting communication can include preventing communication. Communication between the battery pack and the device can include providing battery charge data to the device.

The authentication can further include receiving an encrypted random number from the device, the random number encrypted using the first encryption key. The received random number is decrypted using the first encryption key. The decrypted random number is encrypted using the second encryption key. The random number encrypted with the second encryption key is transmitted to the device.

In general, in one aspect, a battery pack is provided. The battery pack includes one or more battery cells, a battery management system including an integrated processor, and a communication engine including a random number generator.

Implementation can include one or more of the following advantages. A battery management system is provided for enabling secure authentication between a battery pack and a device/charger. A battery management system in a battery pack can include a random number generator. The random number generator can generate one or more random numbers to facilitate an authentication process. Using the authentication process, the battery pack can authenticate, or be authenticated by, the connected device/charger. The battery management system can also include keys for encrypting and decrypting random numbers. The encryption and decryption functions can be used both for authenticating the device/charger but also for being authenticated by the device/charger.

The details of one or more embodiments of the invention are set forth in the accompanying drawings and the description below. Other features, objects, and advantages of the invention will be apparent from the description and drawings, and from the claims. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Reference will be made to a one-chip battery management system where a microcontroller, non-volatile memory and other circuit components are integrated in a single integrated circuit. Alternatively, the proposed methods and systems can be realized in a multi-chip solution. The methods and systems disclosed can be implemented in these and other architectures as would be understood by those of ordinary skill in the art.

Battery Pack Including Battery Management System

Figure 1A:
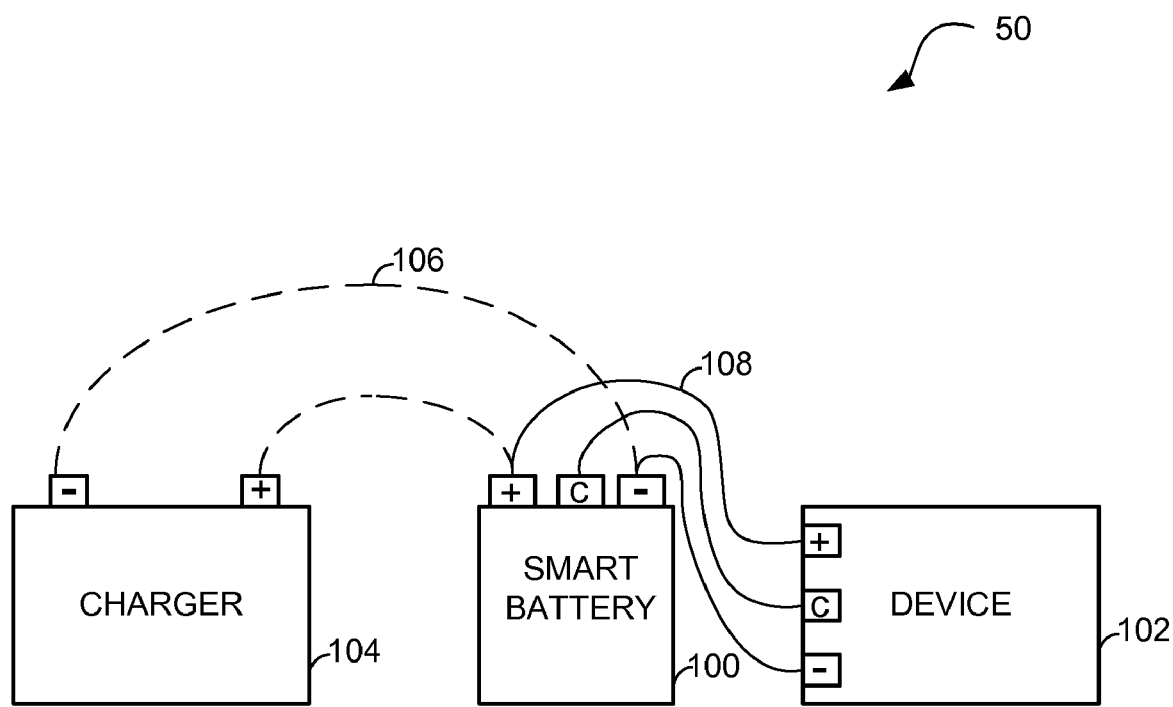
FIG. 1A is a schematic diagram of an application including a battery pack.

Referring now to FIG. 1A, a battery pack 100 for use in an application 50 is shown. Battery pack 100 can be coupled to either a device 102 or a charger 104. When coupled to the charger 104, terminals (i.e., positive, negative, and optionally communication terminals) of the battery pack 100 are coupled by a medium 106 to corresponding terminals (i.e., positive, negative and communication terminals) of the charger 104 to allow for the charging of cell(s) associated with the battery pack 100. Medium 106 can be of the form of wires, leads, pins, or other means of electrical connection.

Similarly, when coupled to a device 102, terminals (i.e., positive, negative, and communication terminals) of the battery pack 100 are coupled by a medium 108 to corresponding terminals (i.e., positive, negative, and communication terminals) of the device 102 to allow for the operation of the device 102. Medium 108 can be of the form of wires, leads, pins, or other means of electrical connection. In some implementations, battery pack 100 is also coupled to device 102 and charger 104 at respective communication ports. Communication ports allow for the transfer of information (e.g., command and control) between the device 102/charger 104 and battery pack 100. One example of information that can be exchanged includes the battery charge level (i.e., capacity).

Figure 1B:
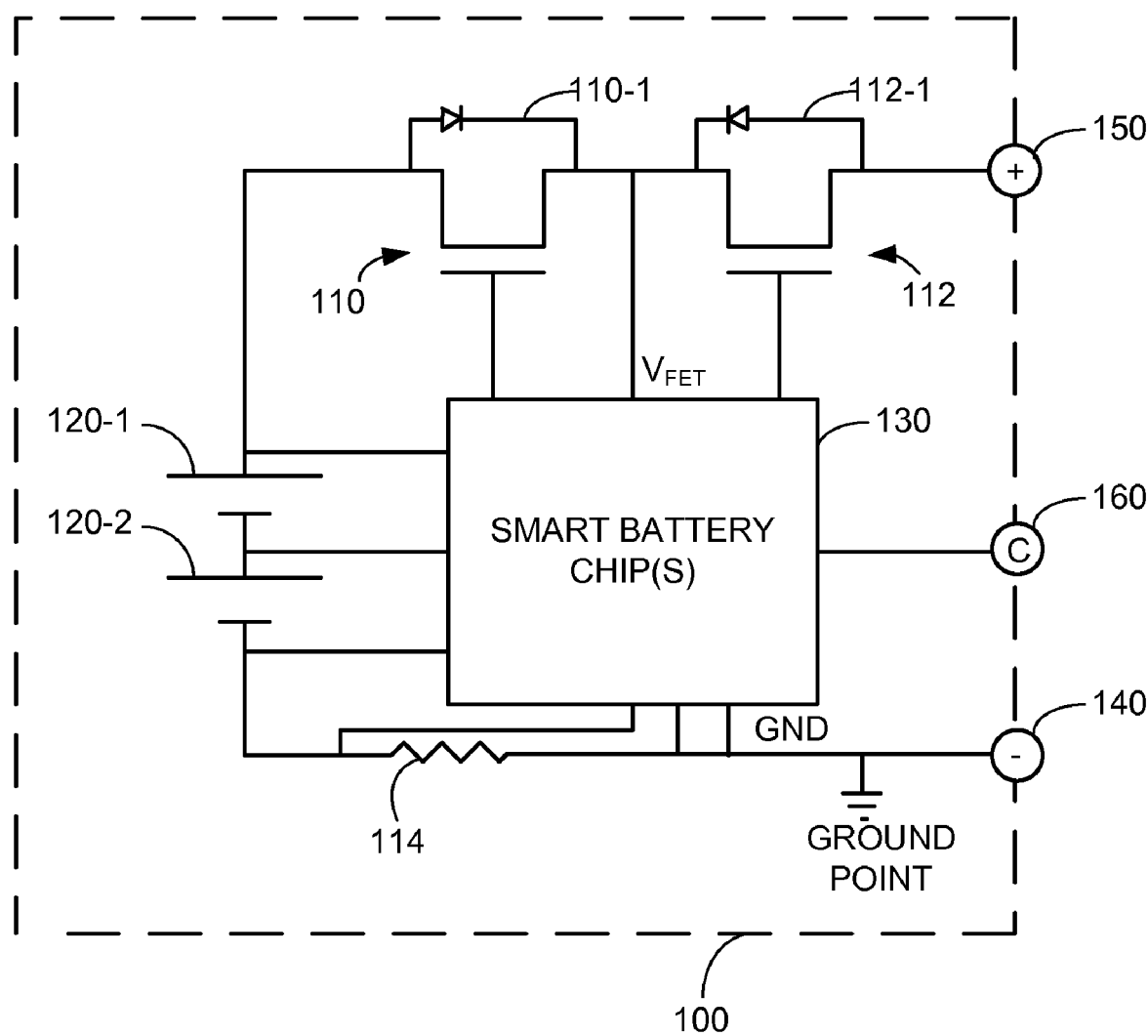
FIG. 1B is a schematic diagram of a battery pack.

Referring now to FIG. 1B, a more detailed schematic diagram is provided for battery pack 100. Battery pack 100 includes one or more battery cells 120, discrete transistors 110, 112, a shunt resistor 114, and battery management system 130. Battery management system 130 includes plural components, as discussed below, which can be integrated in a single package (e.g., integrated into a single integrated circuit). Alternatively, battery management system 130 components can be packaged separately. Discrete transistors 110, 112 can be separate from battery management system 130 and included in a separate package (i.e., a two-chip, or three-chip solution) or can be packaged together with the battery management system 130 components.

Discrete transistors 110, 112 are used to disconnect the battery cells 120 from the external battery pack terminals (external battery pack positive terminal 150 and negative terminal 140). In the implementation shown, two discrete transistors are shown which can be of the form of FETs. While other transistor technologies can be used, FETs present advantages in terms of process, performance (e.g., on-resistance), cost, size etc. In the implementation shown, two transistors are provided and represent separate charge 110 and discharge 112 transistors. Charge transistor 110 is used to enable safe charging of the battery cells 120. Discharge transistor 112 is used to enable safe discharging of the battery cells 120. The charge and discharge transistors 110, 112 are coupled in series. In one implementation, two NFET transistors are used and are coupled drain-drain in a series configuration. Alternatively, two PFET transistors could be used and be coupled source-source. In a PFET solution additional diodes not shown may be required to provide power to the battery management system 130 (i.e., to feed $V_{fet}$).

In the implementation shown, the charge and discharge transistors 110, 112 are coupled in a high-side configuration (i.e., the series transistors are coupled to the high side of the battery cells as opposed to a low-side configuration). In the high-side configuration shown, one terminal of the charge transistor 110 (a source in a NFET implementation) is coupled to the positive terminal of the battery cell 120-1. One terminal of discharge transistor 112 (also a source in a NFET implementation) is coupled to the external battery pack positive terminal 150. Respective second terminals of the charge and discharge transistors 110, 112 are coupled to each other (forming a drain-drain junction in a NFET implementation). Gates of charge transistor 110 and discharge transistor 112 are coupled to battery management system 130 at inputs OC and OD, respectively. Similarly, the junction between the transistors 110, 112 is coupled to the battery management system 130 at a battery management system input (or sometimes referred to herein as $V_{FET}$). The battery management system input provides operational power to the battery management system 130.

In the implementation shown, two transistors are required to be able to block the current flow in both directions. More specifically, FETs include a parasitic diode (labeled 110-1 and 112-1, respectively) and accordingly having a single FET would not allow for the disabling of current flow in both directions. When two FETs are used in series (either source to source, or drain to drain), current flow into and out of the battery cells can be disabled. Similarly, when two transistors are used, selective control can be exercised to allow current flow in only a single direction at a given time (i.e., charge is allowed, but discharge is not until sufficient charge has been placed into the battery cells).

Battery cells 120 are rechargeable batteries and can be of the form of Lithium ion (Li-ion) or Lithium polymer ("Li-polymer"). Other battery technology types are possible. Where plural cells are provided, the battery cells 120 are coupled in series. In the two cell implementation shown, a top-most positive terminal of battery cell 120-1 is coupled to the battery management system 130 (e.g., to allow for the detection of the battery voltage level) and to one of the discrete transistors (i.e., the charge transistor 110). The negative terminal of the top most battery cell 120-1 is coupled to the positive terminal of the bottom most battery cell 120-2 and to the battery management system 130 at input 170. The negative terminal of the bottom most battery cell 120-2 in the series is coupled to the battery management system 130 (e.g., to allow for the detection of the battery voltage level) and to one terminal of the shunt resistor 114. Though a two battery cell implementation is shown, other numbers of battery cells can be included in battery pack 100 including a single battery cell configuration or other multiple cell configurations. The second terminal of the shunt resistor 114 is coupled to local ground (battery management system local ground), the battery management system 130 (to allow for the measurement of current flow through the shunt resistor 114) and to the external battery pack negative terminal 140 of the battery pack 100.

Battery management system 130 includes supervisor electronics to protect the battery in case of incorrect operation, monitoring electronics to estimate remaining battery capacity, a controller (e.g., a micro-controller) for system control and communication with the device coupled to the battery pack 100 and memory (e.g., EEPROM, Flash ROM, EPROM, RAM, etc.). As discussed above certain battery technologies can create dangerous conditions if improperly used. For example, Li-ion and Li-polymer batteries can overheat, explode or self-ignite if they are overcharged or discharged too rapidly. Further, Li-ion and Li-polymer batteries can lose a significant amount of their charge capacity if they are too deeply discharged. Battery management system 130 includes supervisory electronics to ensure fault free operation.

Monitoring electronics that are part of battery management system 130 can be used to estimate remaining battery capacity. Battery capacity information can be communicated between the battery management system 130 and connected device/charger through a communications port terminal 160. As will be discussed in greater detail below, the battery management system 130 can also include authentication features for communication between battery pack 100 and a device/charger.

Battery Management System

Figure 2:
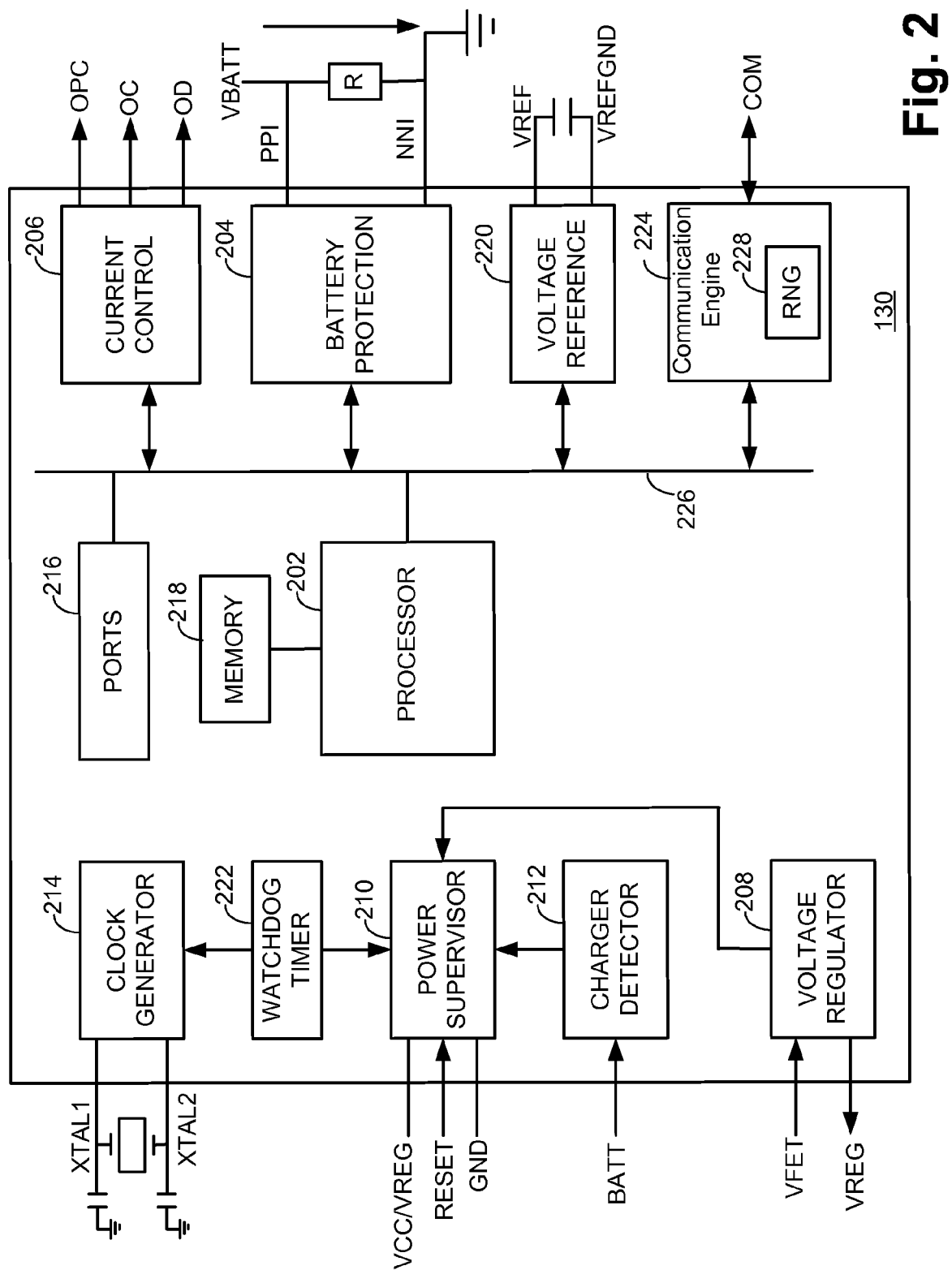
FIG. 2 is a block diagram of a battery management system including a random number generator.

FIG. 2 shows a block diagram of an exemplary battery management system 130 used in the battery pack 100. The battery management system 130 generally includes a processor 202 (e.g., a low-power, CMOS 8-bit microcontroller based on a RISC architecture), a battery protection circuit 204, a current flow controller 206, a voltage regulator 208, a power supervisor 210, a charge detector 212, a clock generator 214, ports 216, a memory 218, a voltage reference 220, a watchdog timer 222, and a communication engine 224. The processor 202, ports 216, battery protection circuit 204, voltage reference 220, and communication engine 224 are each coupled to a data bus 226.

A practical implementation of the battery management system 130 can include other components and subsystems, which have been removed from FIG. 2 for clarity purposes. For example, the battery management system 130 can include circuitry for battery monitoring (e.g., analog-to-digital converters), cell balancing circuitry (e.g., cell balancing FETs) for balancing cell voltages, a communication device for communicating with a external device, noise suppression circuitry, wake-up timer, and other monitor or control circuitry.

The memory 218 can be programmed with instructions that can be executed by the processor 202 to perform various tasks, such as cell balancing, battery protection, current measurements for determining charge level, as well as communication and authentication tasks.

In some implementations, the current flow controller 206 has several outputs (e.g., OC, OD) which are coupled to external devices that can be configured by the current flow controller 206 to control the current flow between the battery cells and a device or charger. The current flow controller 206 includes various circuits and logic (e.g., operational amplifiers, control and status registers, transistors, capacitors, diodes, inverters, gates, etc.) for generating voltages at the outputs (e.g., OC and OD). In some implementations, the OC output is a high voltage output that is coupled to the gate of a charge FET (e.g., charge transistor 110) to completely or partially enable or disable the charge FET to control current flow during a charging event. The OD output is a high voltage output that is coupled to the gate of a discharge FET (e.g., discharge transistor 112) to completely or partially enable or disable the discharge FET to control current flow during a discharging event. FIG. 1B shows an exemplary configuration of FET devices in a high side implementation for controlling current flow in response to control voltages from the current flow controller 206.

The current flow controller 206 is coupled to the battery protection circuit 204 through interface 240. The battery protection circuit 204 includes circuitry (e.g., a differential amplifier) for monitoring the battery cell voltage and charge/discharge currents to detect fault conditions, and to initiate actions (e.g., disabling or partially disabling charge, discharge and pre-charge FETs) to protect the battery pack 100 from being damaged. Examples of fault conditions include but are not limited to: deep under-voltage during discharging, short-circuit during discharging and over-current during charging and discharging. In some implementations, a current sense resistor ($R_{sense}$, i.e., shunt resistor 114) can be coupled across the PPI and NNI inputs of the battery protection circuit 204, where PPI is an unfiltered positive input from the current sense resistor and the NNI is an unfiltered negative input from the current sense resistor. The current sense resistor can be coupled to the battery cells and battery management system 130, as described with respect to FIG. 1B.

The communication engine 224 is coupled to the data bus 226 and the communications port terminal 160. The communication engine 224 provides for data communication between the battery packs 100 and a coupled device (e.g., device 102 or charger 104 in FIG. 1A). For example, the communication engine 224 can provide battery status data to the device, for example, charge level data. The battery charge level data can be used by the device, for example, in a charge display indicating the level of remaining charge (e.g., a battery level indicator on a mobile phone).

In one implementation, the communication engine 224 is configured to provide secure authentication between the battery pack and the connected device. For example, the communication engine 224 determines whether or not the connected device is an accepted or authorized device (i.e., a "friendly" device). An unfriendly device, for example, could be a device used to reverse engineer the features of the battery pack. Additionally, the communication engine 224 can be used to provide data flow to the processor for authenticating the battery pack.

For example, a device can be designed to function with a particular battery pack type. The authentication process can be used to ensure that the device is using the correct battery pack (i.e., that the correct battery type has been connected to the device). If authentication fails, the battery pack can provide limited communication to the device reducing device functionality. For example, the device can be unable to receive and display battery charge data. In one implementation, an unauthorized device or battery pack can result in blocked communication between the battery pack and the device or disabling of the discharge transistor which would result in no current being delivered to the device.

The communication engine 224 includes a random number generator ("RNG") 228. The RNG 228 is configured to generate one or more random numbers to support the authentication functions of the communication engine 224. The RNG 228 can use physical properties or one or more mathematical algorithms to generate a sequence of numbers, the pattern of which is not readily discernable.

In one implementation, the RNG is not contained within the communication engine 224. The RNG can be a separate component within the battery management system 130. The RNG can be coupled to the communication engine 224, for example, though the data bus 226.

Random Number Generator Communication Method

Figure 3A:
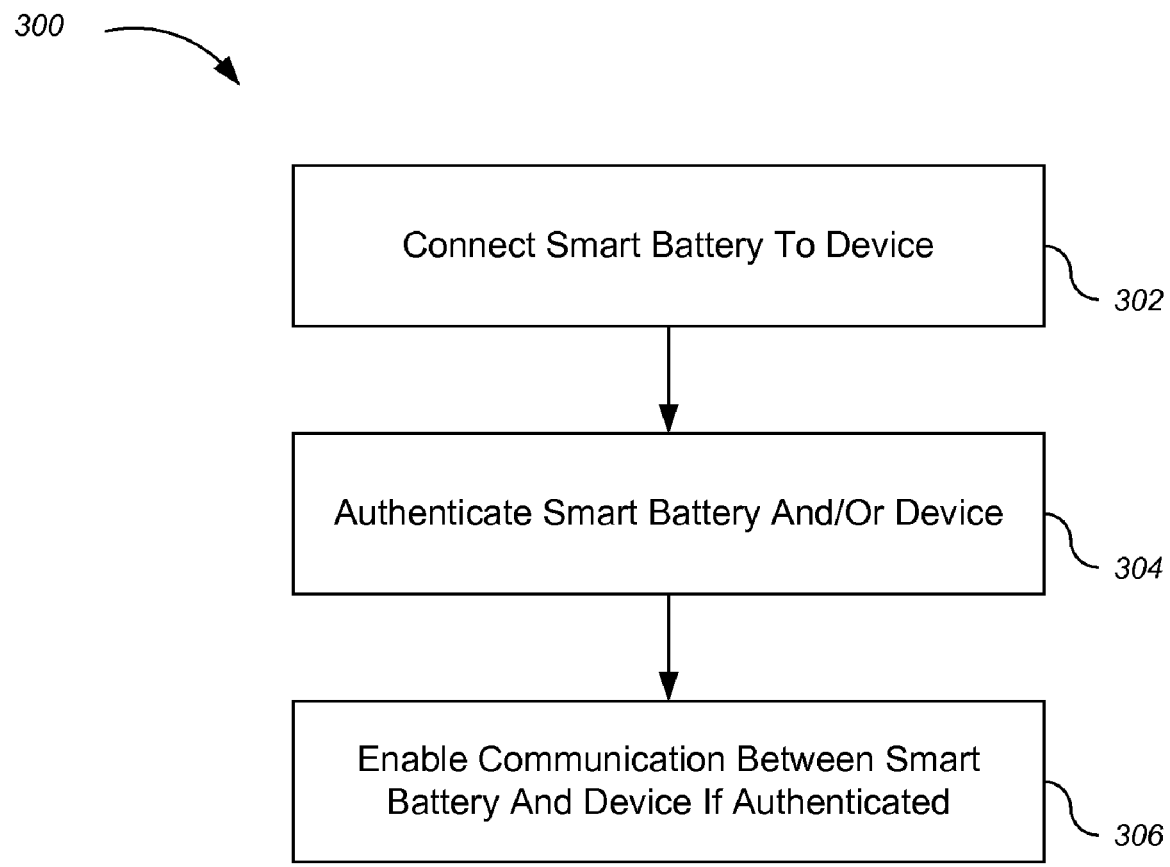
FIG. 3A is a process for providing communication in a battery management system.

Referring now to FIG. 3A, a flow diagram for a method 300 for providing communication between a battery pack and a connected device is provided. Method 300 includes connecting the battery pack to the device (step 302). For example, the positive, negative, and communications terminals of the battery pack (e.g., battery pack 100) can be coupled to the corresponding terminals of the device (e.g., device 102) using a medium (e.g., medium 108).

After connecting the battery pack to the device, an authentication procedure occurs to authenticate the battery pack, the connected device, or both (step 302). The authentication steps are discussed in greater detail below with respect to FIG. 3B. If the authentication process succeeds, communication between the battery pack and the device is enabled. For example, if authentication is successful, the communication engine (e.g., communication engine 224) of the battery pack can provide battery charge data to the device.

Authentication Process

Figure 3B:
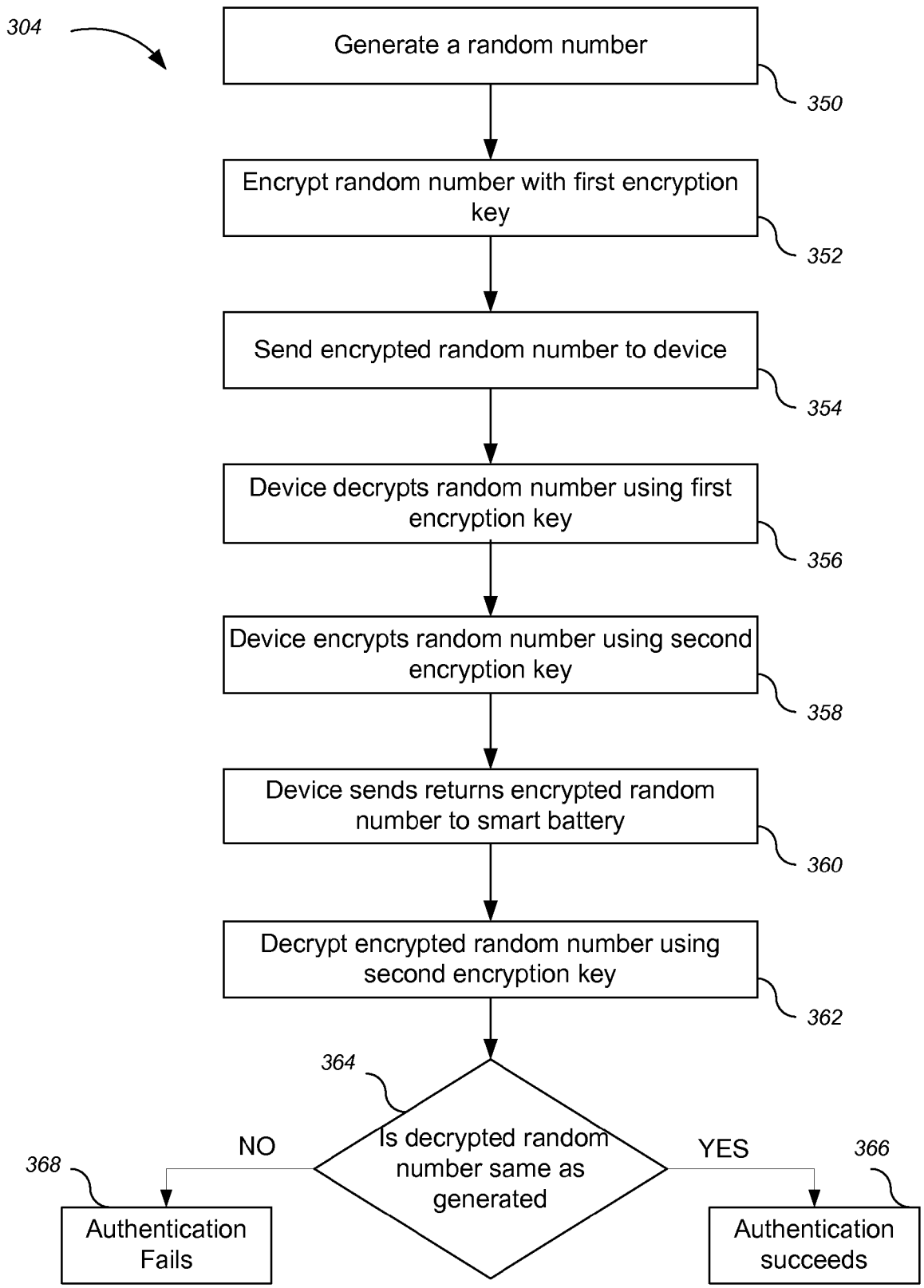
FIG. 3B is an exemplary one-way authentication process for authentication in a battery management system.

Referring now to FIG. 3B, a flow diagram for an exemplary one-way authentication process 304 is provided for a battery pack to authenticate a device. The authentication process 304 can begin with the generation of a random number (step 350). For example, a RNG in the battery pack (e.g., RNG 228) can generate a random number when the authentication process is initiated by the communication engine after connecting the battery pack to the device.

In one particular authentication scheme, the generated random number is then encrypted using a first encryption key (step 352). An encryption key defines a transform for encrypting data or for decrypting data that has been encrypted using the key. The key can be unique to the battery pack but known to the device. The correct key must be used to recover the original data. In one implementation, the communication engine includes one or more encryption keys and is configured to provide both encryption and decryption functions.

Alternatively, the communication engine can call a processor (e.g. processor 202) in the battery pack to provide the required encryption (and/or decryption) function. The processor can work in concert with other battery pack components, for example a memory (e.g., memory 218), to provide the encryption/decryption function. For example, the memory 218 can store encryption keys which can be used to perform the encryption and decryption processes.

The encrypted random number is then transmitted to the device (step 354). For example, the communication engine can send the encrypted random number using a connection to the communication port (e.g., communication port 160) of the battery pack.

After receipt from the battery pack, the device decrypts the encrypted random number (step 356). In one implementation, the device uses the same first encryption key to decrypt the received random number as the battery pack used to encrypt the random number (e.g., a symmetrical key). After decrypting the encrypted random number, the device then re-encrypts the random number with, optionally, a second encryption key (step 358). A second different encryption key can be used that is unique to the device, but that is known by the battery pack. In one implementation, the battery pack and the device each contain the first key and the second key. Alternatively, in one implementation, the first and second keys are not symmetrical keys. Thus, the battery pack includes encryption key 1 and decryption key 2 and the device includes encryption key 2 and decryption key 1. The device transmits the random number encrypted with the second encryption key to the battery pack (step 360). As with the transmission of the encrypted random number sent from the battery pack, the device can transmit the encrypted random number to the communications port of the battery pack.

The battery pack decrypts the encrypted random number (step 362). Again, the battery pack must include (or be able to access) the same second encryption key used by the device. For example, the communication device can include the second encryption key and decrypt the random number. Alternatively, as with the encryption process, the communication device can call the processor to assist or perform the decryption of the random number.

Once decrypted, the random number is compared with the random number originally generated by the RNG of the communication device (step 364). For example, the communication device can retain the generated random number in order to carry out the authentication process. If the RNG generated random number matches the decrypted random number, the authentication succeeds (step 366). If the authentication succeeds, the battery pack has verified the device as friendly (e.g., the device is an authorized device for use with the battery pack). Communication between the battery pack and the connected device can be enabled as discussed above with respect to FIG. 3A.

However, if the RNG generated random number does not match the decrypted random number, the authentication fails (step 368). For example, if the device does not have the correct encryption key, an attempt to decrypt the random number received from the battery pack can result in an incorrect number. In another example, a device can attempt to bypass the authentication process by generating a replacement encrypted random number; however, the replacement number will not match the generated random number of the RNG. In another example, if a device is not an authorized device type, the device will not know how to respond to the received encrypted random number. Consequently, the authorization process can also fail if a response is not received from the device within, for example, a predetermined period of time.

In one implementation, in addition or alternative to the authentication process 304 shown in FIG. 3B, a similar one-way authentication process for authenticating a battery pack by a device can be performed. In this implementation, the operations described above are reversed and a mirror authentication process as described below is performed (e.g., a RNG in the device generates a random number that can be used to authenticate that the battery pack is acceptable to the device).

In one implementation, two-way authentication is required. In a two-way authentication process, a mirror authentication process to process 304 takes place except the random number is initially generated by a RNG located on the device. The device then sends the initial encrypted random number to the communication engine of the battery pack. The battery pack decrypts the received random number and then re-encrypts the number using a second encryption key. The encrypted random number is then sent to the device. The device then compares the originally generated random number with the random number received from the battery pack. The mirror authentication process allows the device to verify that the battery pack is friendly (i.e., that the battery pack is an accepted battery pack type). In one implementation, successful authentication in both directions is necessary for communication between the battery pack and the device.

The authentication process 304 disclosed above is only one possible authentication scheme utilizing a random number generated by the battery pack. Other possible authentication techniques can be used to enable communications between the battery pack and the coupled device.

A number of embodiments of the invention have been described. Nevertheless, it will be understood that various modifications may be made without departing from the spirit and scope of the invention. Accordingly, other embodiments are within the scope of the following claims.

What is claimed is:

1. A battery pack, comprising:
one or more battery cells;
a battery management system that authenticates a device at the battery management system and includes an integrated processor; and
a communication engine including a random number generator.

2. The battery pack of claim 1 further comprising:
a high-side NFET charge transistor coupled to a high-side NFET discharge transistor in series.

3. The battery pack of claim 2, where the battery management system is coupled to the high-side NFET charge transistor and the high-side NFET discharge transistor.

4. The battery pack of claim 1, where the integrated processor is configured to encrypt a random number generated by the random number generator using a first encryption key.

5. The battery pack of claim 4, where the integrated processor is configured to decrypt an encrypted random number received from the device using a second encryption key.

6. An apparatus, comprising:
a high-side NFET charge or discharge transistor operable to enable charging of one or more cells of a battery pack;
a battery management system that authenticates a device at the battery management system, where the battery management system is coupled to the high-side NFET charge or discharge transistor, and the battery management system includes a communication engine; and
a random number generator.

7. A device, comprising:
a first integrated processor;
a battery pack including:
one or more battery cells,
a battery management system that authenticates the device at the battery management system, and
a communication engine including a random number generator.

8. The device of claim 7, where the battery management system includes a second integrated processor that encrypts a random number generated by the random number generator using a first encryption key.

9. The device of claim 8, where the first integrated processor is configured to decrypt an encrypted random number using a second encryption key.

10. The device of claim 7, where the battery pack further includes a high-side NFET charge transistor coupled to a high-side NFET discharge transistor in series.

11. The device of claim 10, where the battery management system is coupled to the high-side NFET charge transistor and the high-side NFET discharge transistor.

* * * * *

UNITED STATES PATENT AND TRADEMARK OFFICE
CERTIFICATE OF CORRECTION

PATENT NO. : 7,863,858 B2
APPLICATION NO. : 12/482375
DATED : January 4, 2011
INVENTOR(S) : Gunnar Gangstoe, Hideyuki Sato and Arne Aas It is certified that error appears in the above-identified patent and that said Letters Patent is hereby corrected as shown below:

Cover page, column 2, Abstract (57), line 3, delete "provided." and insert -- is provided. --

Column 1, lines 58-59, delete "provided." and insert -- is provided. --

Column 4, line 3, delete "$V_{fet}$)." and insert -- $V_{FET}$). --

Signed and Sealed this
Eighth Day of March, 2011

David J. Kappos
*Director of the United States Patent and Trademark Office*